UNITED STATES PATENT OFFICE.

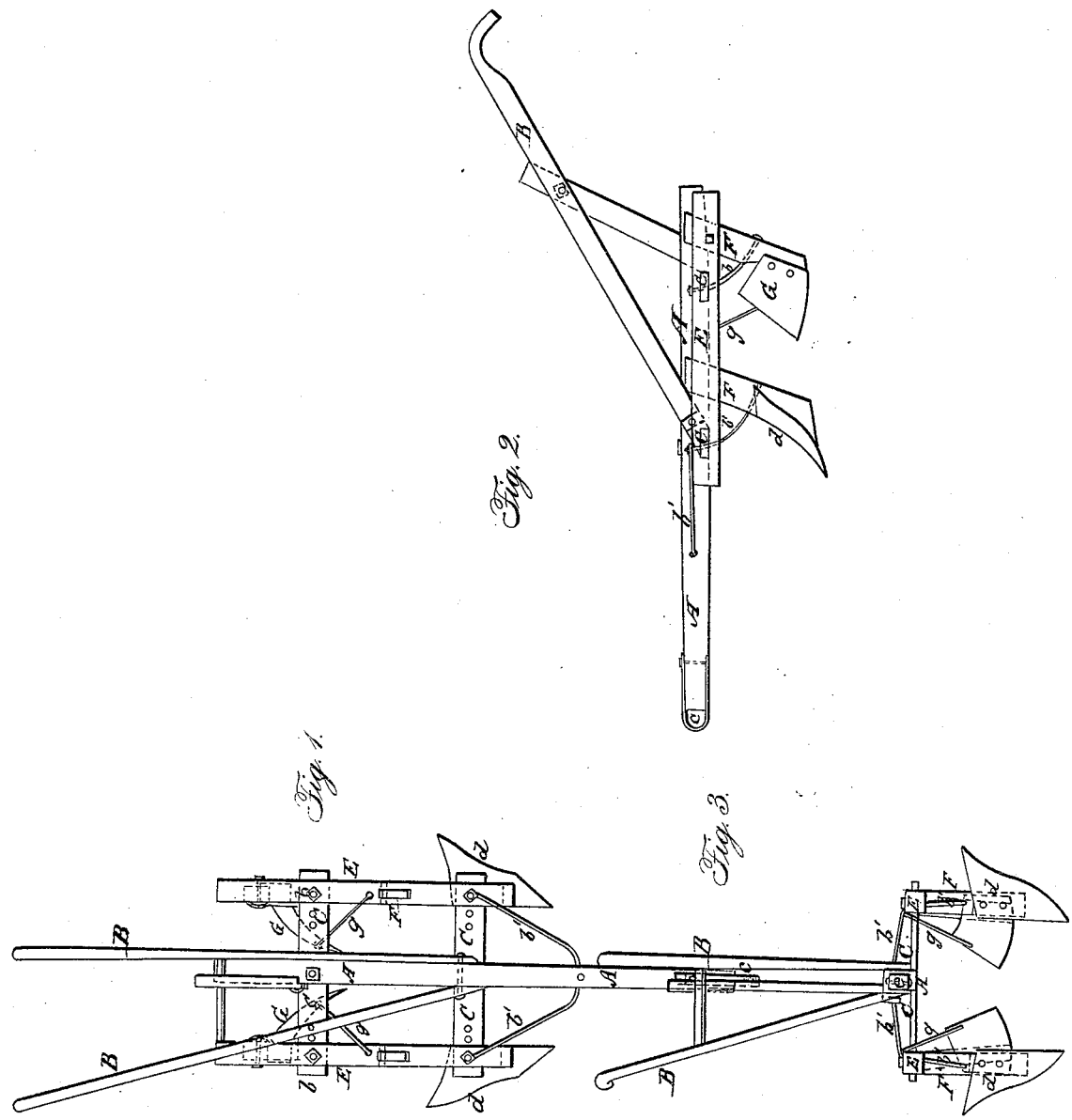

W. A. TAYLOR AND W. W. GRAVES, OF FORT ADAMS, MISSISSIPPI.

IMPROVEMENT IN CULTIVATORS.

Specification forming part of Letters Patent No. 29,637, dated August 14, 1860.

*To all whom it may concern:*

Be it known that we, W. A. TAYLOR and W. W. GRAVES, both of Fort Adams, in the county of Wilkinson and State of Mississippi, have invented a new and Improved Cultivator; and we do hereby declare that the following is a full, clear, and exact description thereof, reference being had to the accompanying drawings, making part of this specification, in which—

Figure 1 shows a plan view of the improved cultivator. Fig. 2 is a side elevation of same. Fig. 3 is an end elevation of same.

Similar letters of reference indicate corresponding parts in the three figures.

This cultivator is intended for loosening the soil, thinning out plants, and scraping the sides of the hills in drill-husbandry. It consists in the use of a quadrangular frame capable of being adjusted laterally to adapt the machine to rows of different widths, two plows for hill plowing attached to standards that are secured to the adjustable beams of the frame, said standards being braced to the frame in a peculiar manner, and two scrapers placed in rear of the plows and braced in a novel manner, all as will be hereinafter described.

To enable those skilled in the art to fully understand our invention, we will proceed to describe its construction and operation.

In the drawings, A is the draft-beam, with clevis c, to which the animals are attached, and B B are handles that are attached to the central draft-beam, so as to enable the driver to control the machine without walking on the hills.

C C are two traverse-pieces that are securely bolted to the beam A, and project out each side thereof equal distances. To these cross-pieces C C the two longitudinal plow-beams E E are attached by passing the pieces C C through mortises in the beams, and securing them fast by braces $b\ b$, that serve to brace the inclined standards F F F' F'. The standards F F are longer than the standards F' F', and these standards have attached to them the light mold-boards $d\ d$, which loosen the earth on each side of the row. The standards of these plows are braced by a rod, $b'$, that passes from one standard F, through the beam E, and piece C, through the central beam, A, and through the opposite beam E and standard F. The rear standards, F F', carry the scrapers G G, which are simply two wings set in an inclined state, with their lower cutting-edges inclined at opposite angles, so as to be on planes with the two sides of the hill. As shown in Figs. 2 and 3, the standards F' F' are beveled so as to give to the scrapers these angles.

$g\ g$ are two rods connecting with the edges of the scrapers and beams E E, that serve as brace-rods for the scrapers.

Having thus described our invention, what we claim as new, and desire to secure by Letters Patent, is—

The adjustable beams E E, plows $d\ d$, brace-rods $b'$, and the scrapers G G, with their standard-braces $b\ b$, and the brace-rods $g\ g$, all combined and arranged in the manner herein set forth.

W. A. TAYLOR.
W. W. GRAVES.

Witnesses:
A. J. VANCE,
G. E. W. THOMPSON.